United States Patent
Kazmierczak et al.

(10) Patent No.: US 12,248,077 B2
(45) Date of Patent: Mar. 11, 2025

(54) SYSTEM AND METHOD FOR AIRBORNE GNSS RF INTERFERENCE DETECTION

(71) Applicant: Rockwell Collins, Inc., Cedar Rapids, IA (US)

(72) Inventors: Jeremy R. Kazmierczak, Rockledge, FL (US); Angelo J. Joseph, Melbourne, FL (US); George Cook, Orlando, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 399 days.

(21) Appl. No.: 17/560,634

(22) Filed: Dec. 23, 2021

(65) Prior Publication Data

US 2023/0204789 A1    Jun. 29, 2023

(51) Int. Cl.
     *G01S 19/21*      (2010.01)
     *G08G 5/00*      (2006.01)

(52) U.S. Cl.
     CPC .......... *G01S 19/21* (2013.01); *G08G 5/0004* (2013.01)

(58) Field of Classification Search
     CPC ............................ G01S 19/21; G08G 5/0004
     USPC .................................................... 342/357.59
     See application file for complete search history.

(56) References Cited

U.S. PATENT DOCUMENTS

| | | | |
|---|---|---|---|
| 10,137,863 B2 * | 11/2018 | Johnson | H04K 3/65 |
| 11,194,052 B1 * | 12/2021 | Kazmierczak | G01S 19/215 |
| 12,019,169 B2 * | 6/2024 | Johnson | G01S 19/243 |
| 12,078,731 B2 * | 9/2024 | Rath | G01S 19/21 |
| 2017/0070971 A1 | 3/2017 | Wietfeldt et al. | |
| 2020/0380875 A1 * | 12/2020 | Letsu-Dake | G08G 5/065 |
| 2021/0239848 A1 | 8/2021 | Karvounis et al. | |
| 2023/0020614 A1 * | 1/2023 | Dugas | G08G 5/0013 |
| 2023/0350074 A1 * | 11/2023 | Rath | G01S 5/011 |
| 2023/0386347 A1 * | 11/2023 | Parker | G08G 5/045 |
| 2024/0019581 A1 * | 1/2024 | Joseph | H04K 3/255 |

FOREIGN PATENT DOCUMENTS

| | | | |
|---|---|---|---|
| CN | 107567003 A * | 1/2018 | H04W 4/33 |
| CN | 109557561 A | 4/2019 | |
| CN | 110988922 A | 4/2020 | |

(Continued)

OTHER PUBLICATIONS

B. Kujur, S. Khanafseh and B. Pervan, "Detecting GNSS spoofing of ADS-B equipped aircraft using INS," 2020 IEEE/ION Position, Location and Navigation Symposium (PLANS), 2020, pp. 548-554, doi: 10.1109/PLANS46316.2020.9109966.

(Continued)

*Primary Examiner* — Chuong P Nguyen
(74) *Attorney, Agent, or Firm* — Suiter Swantz IP

(57) ABSTRACT

A system and method for interference detection. The system and method receives flight data comprising a plurality of flights. The system and method identifies a plurality of signal drop events based on at least the flight data. The system and method determines one or more co-located signal drop event subsets based on at least the plurality of signal drop events and filter criteria. The system and method determines one or more interference events based on the one or more co-located signal drop event subsets, wherein each of the one or more co-located signal drop event subsets is based on at least two or more of the plurality of signal drop events.

15 Claims, 4 Drawing Sheets

(56) References Cited

FOREIGN PATENT DOCUMENTS

| | | | | | |
|---|---|---|---|---|---|
| CN | 112558113 | A | | 3/2021 | |
| CN | 113064184 | A | * | 7/2021 | ............ G01S 19/21 |
| CN | 113740882 | A | * | 12/2021 | ............ G01S 19/21 |
| CN | 113759392 | B | * | 8/2023 | ............ G01S 19/21 |
| EP | 3882666 | A1 | | 9/2021 | |
| GB | 2530272 | A | | 3/2016 | |

OTHER PUBLICATIONS

Kazmierczak, Jeremy et al., "Aviation GNSS Interfence Analysis Based on ADS-B Out Data", 34th International Technical Meeting of the Satellite Division of the Institute of Navigation (ION GNSS+ 2021), St. Louis, Missouri, Sep. 2021, pp. 1108-1121.

* cited by examiner

200

202 — RECEIVING FLIGHT DATA COMPRISING A PLURALITY OF FLIGHTS

204 — IDENTIFYING A PLURALITY OF SIGNAL DROP EVENTS BASED ON AT LEAST THE FLIGHT DATA

THE PLURALITY OF SIGNAL DROP EVENTS BEING A PLURALITY OF AUTOMATIC DEPENDENT SURVEILLANCE-BROADCAST (ADS-B) OUT SIGNAL DROP EVENTS

206 — DETERMINING ONE OR MORE CO-LOCATED SIGNAL DROP EVENT SUBSETS BASED ON AT LEAST THE PLURALITY OF SIGNAL DROP EVENTS AND FILTER CRITERIA

208 — DETERMINING ONE OR MORE INTERFERENCE EVENTS BASED ON THE ONE OR MORE CO-LOCATED SIGNAL DROP EVENT SUBSETS, WHEREIN EACH OF THE ONE OR MORE CO-LOCATED SIGNAL DROP EVENT SUBSETS IS BASED ON AT LEAST TWO OR MORE OF THE PLURALITY OF SIGNAL DROP EVENTS

210 — PROVIDING THE ONE OR MORE INTERFERENCE EVENTS IN REAL-TIME TO AT LEAST ONE OF AN AIR TRAFFIC CONTROL OR A PILOT OF AN AIRCRAFT

FIG.2B

SYSTEM AND METHOD FOR AIRBORNE GNSS RF INTERFERENCE DETECTION

TECHNICAL FIELD

The present disclosure relates generally to radio frequency (RF) interference event detection, and, more particularly, to RF interference event detection using ADS-B Out data.

BACKGROUND

Electromagnetic RF signaling is used worldwide and is critical to many industries. Global Navigation Satellite Systems (GNSS) are RF-based positioning systems widely deployed to provide location, navigation, and time services worldwide. GNSS include the United States Global Positioning System (GPS), the Russian GLONASS system, the Chinese Beidou system, and the European Galileo system. Today the GPS system typically may provide the primary means of navigation and surveillance in air transport. In the future, the Galileo and Beidou systems may be used in addition to GPS to fulfill similar functions. Unfortunately, external RF interference can affect the signal quality of an RF communication and cause a loss of signal.

Automatic Dependent Surveillance-Broadcast (ADS-B) is a critical and advanced surveillance technology that broadcasts a combination of an aircraft's positioning source (e.g., GNSS), aircraft avionics, and ground data, to provide accurate surveillance. ADS-B includes an ADS-B Out service and an ADS-B In service. The ADS-B Out broadcasts an aircraft's location, altitude, ground speed, and other data to ground stations and other aircraft. ADS-B Out requirements are located in 14 CFR § 91.225 and equipment performance requirements are contained in § 91.227. ADS-B In is a service providing aircraft operators with weather and positions of other aircraft. Many airports are equipped with an ADS-B receiver or transceiver to receive the ADS-B Out transmissions.

SUMMARY

A method for interference detection is disclosed, in accordance with one or more embodiments of the present disclosure. The method includes receiving flight data comprising a plurality of flights. The method includes identifying a plurality of signal drop events based on at least the flight data. The method includes determining one or more co-located signal drop event subsets based on at least the plurality of signal drop events and filter criteria. The method includes determining one or more interference events based on the one or more co-located signal drop event subsets. The method includes wherein each of the one or more co-located signal drop event subsets is based on at least two or more of the plurality of signal drop events.

In some embodiments, each flight of the plurality of flights may include a track log, each track log may include a plurality of entries, each entry of the plurality of entries may include a geographic location, and the filter criteria may include a geographic-grouping filter based on the geographic location.

In some embodiments, each entry may include a time, the filter criteria further comprising a time-grouping filter based on the time.

In some embodiments, the identifying the plurality of signal drop events may be based on a change in an originating source of the geographical location.

In some embodiments, the plurality of signal drop events may be a plurality of Automatic Dependent Surveillance-Broadcast (ADS-B) Out signal drop events.

In some embodiments, the determining the one or more interference events may occur in real-time.

In some embodiments, the method may include providing the one or more interference events in real-time to at least one of an air traffic control or a pilot of an aircraft.

In some embodiments, the one or more interference events may be two or more interference events. In some embodiments, the method may include determining a daily occurrence of interference events based on the two or more interference events.

A system for interference detection is disclosed, in accordance with one or more embodiments of the present disclosure. The system includes an electronic processor configured to receive flight data comprising a plurality of flights; identify a plurality of signal drop events based on at least the flight data; determine one or more co-located signal drop event subsets based on at least the plurality of signal drop events and filter criteria; determine one or more interference events based on the one or more co-located signal drop event subsets; wherein each of the one or more co-located signal drop event subsets is based on at least two or more of the plurality of signal drop events.

In some embodiments, each flight of the plurality of flights may include a track log, each track log may include a plurality of entries, each entry of the plurality of entries may include a geographic location, and the filter criteria may include a geographic-grouping filter based on the geographic location.

In some embodiments, each entry may include a time, the filter criteria further comprising a time-grouping filter based on the time.

In some embodiments, the identifying the plurality of signal drop events may be based on a change in an originating source of the geographical location.

In some embodiments, the plurality of signal drop events may be a plurality of Automatic Dependent Surveillance-Broadcast (ADS-B) Out signal drop events.

In some embodiments, the determining the one or more interference events may occur in real-time.

In some embodiments, the system may be configured to provide the one or more interference events in real-time to at least one of an air traffic control or a pilot of an aircraft.

In some embodiments, the one or more interference events may be two or more interference events. In some embodiments, the system may be configured to determine a daily occurrence of interference events based on the two or more interference events.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 2A illustrates a flow diagram depicting a method or process for interference detection, in accordance with one or more embodiments of the present disclosure; and FIG. 2B illustrates a flow diagram depicting a method or process for interference detection, in accordance with one or more embodiments of the present disclosure.

DETAILED DESCRIPTION

Figure 1:
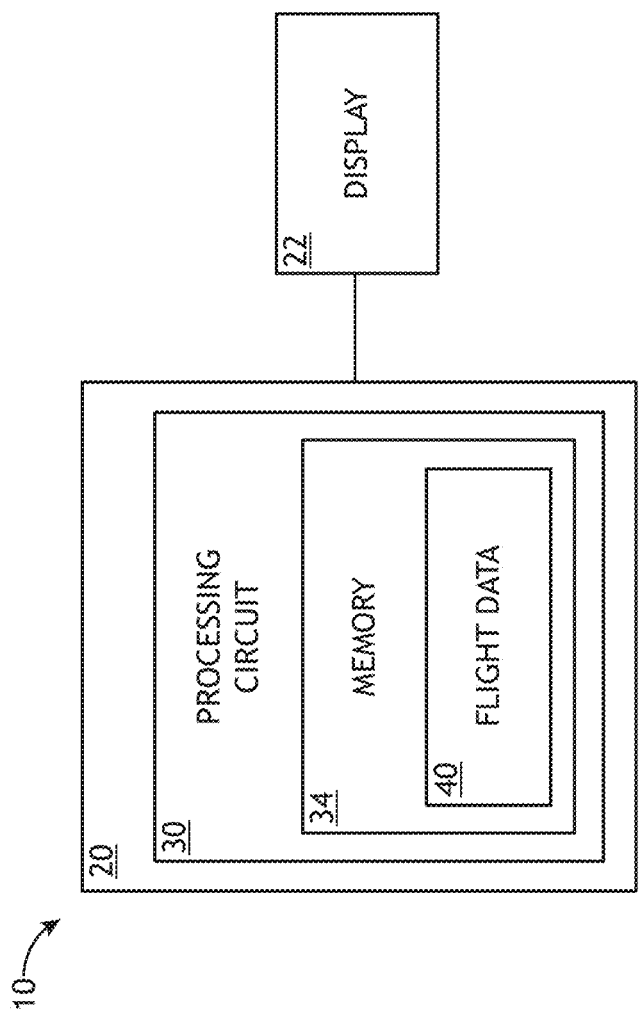
FIG. 1 is a schematic block diagram of an interference detection system, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

FIGS. 1-4 generally illustrate a system and method for interference detection, in accordance with one or more embodiments of the present disclosure.

Aircraft (e.g., pilots) and air traffic control do not always have a real-time or near real-time situational awareness of interference events in order to be properly informed of the best course of action or maneuver to make. For example, some guidance and approach maneuvers should not be performed if GNSS positioning will not be available or will not be reliably available.

Signal drop events (e.g., ADS-B drop events, GNSS drop events) are not necessarily caused by interference, such as external interference events. For example, a signal drop event could be caused by a malfunctioning transponder equipment, a loss of ADS-B coverage area, intentional power-off of the transponder or GNSS equipment, a circuit malfunction, a failure to properly track a GNSS constellation, a failure of a GNSS constellation to properly transmit, or other non-interference causes of signal drop events.

As such, it would be desirable to provide a system and method for detection of interference events.

It is noted that, statistically, an interference event may cause more than one signal drop event of more than one flight, but an internal, non-interference source of a signal drop event (e.g., malfunctioning transponder equipment) may be limited to only the originating aircraft.

For example, a system and method may be configured to allow for real-time detection of interference. For example, the system and method may be configured to allow for real-time detection of interference using filter criteria to co-locate signal drop events. A benefit of real-time detection of interference events is that at least air traffic control and pilots may be more informed as to relevant interference events in real-time, allowing them to make real-time decisions and have real-time situational awareness of the relevant interference events.

A benefit of using filter criteria to co-locate signal drop events of a plurality of flights is that it may help differentiate from signal drop events limited to a signal aircraft (e.g., malfunctioning transponder equipment) and signal drop events of multiple aircraft caused by a common reason (e.g., caused by the same external interference event).

Referring now to FIG. 1, a block diagram of a system 10 for detection of interference events including an interference detection system 20 is shown. The system 10 may be used with at least one display 22.

The system 10 is configured to determine interference events in some embodiments. The determining is implemented using a processing circuit 30 including a memory 34. The processing circuit may be an electronic processor. The system 10 may be located on an aircraft or externally (e.g., ground station).

The display 22 is a flight display in some embodiments. The display 22 is a CRT, LCD, or other display for providing information to a user, such as a pilot. For example, display 22 can be a helmet mounted display (HMD), a head up display (HUD), a head down display (HDD), or another type of display device.

The processing circuit 30 includes at least one processor, which may be any type of general purpose or special purpose processor (e.g., FPGA, CPLD, ASIC, etc.), and at least one memory 34, which may be any type of computer or machine-readable storage medium (e.g., ROM, RAM, hard disk, flash memory, etc.). The processing circuit 30 may be paired with or a component of a communication link, such as via a networking interface (e.g., Ethernet).

The memory 34 may include one or more modules including instructions that may be executed by processing circuit 30 to perform various processing functions for the system 10. The memory 34 may include one or more data flight data 40. For example, the memory 34 includes software instructions for determining interference events in some embodiments.

Referring now to FIG. 2, the method 200 may include one or more of the following steps and may be implemented by the system 20. Additionally, for example, some embodiments may include performing one or more instances of the method 200 iteratively, concurrently, and/or sequentially. Additionally, for example, at least some of the steps of the method 200 may be performed in parallel and/or concurrently. Additionally, in some embodiments, at least some of the steps of the method 200 may be performed non-sequentially.

A step 202 may include receiving flight data comprising a plurality of flights. For example, the interference detection system 20 may be configured to receive flight data comprising a plurality of flights from a third-party flight data provider. For example, the interference detection system 20 may be configured to receive flight data comprising a plurality of flights from an internal database. In another example, the interference detection system 20 may be configured to receive flight data comprising a plurality of flights from one or more aircraft. For instance, the receiving of flight data may be receiving flight data from two or more aircraft, each aircraft comprising a single flight, wherein a plurality of flights includes each flight from the two or more aircraft. The receiving of flight data may be by use of ADS-B In of a receiving aircraft. The receiving of flight data may involve receiving a single flight or a portion of a single flight from a single aircraft, wherein the single flight or the portion of a single flight is combined with one or more flights already stored on memory 34 to provide for the receiving of the flight data or for receiving an update to the flight data. In another example, the interference detection system 20 may be configured to receive flight data comprising a plurality of flights from an air traffic control ground station, or other ground station.

In one instance, the receiving the flight data may occur in real-time or near real-time, based on real-time or near real-time flight data. It is noted that, here and in other portions of this disclosure, that real-time may be near instantaneous except for delays related to network delays, processing delays, and other delays associated with getting the flight data to the interference detection system. It is further noted, real-time or near real-time, may mean information being made available or a determination being made in a time period wherein the information or determination, respectively, is still relevant (e.g., a relevant time period). For example, real-time or near real-time may mean making a determination (e.g., determining interference events) based on information (e.g., flight data) in a time period defined by the period where such interference events are still relevant. For instance, real-time or near real-time may mean a few days, a few hours, a few minutes, or a few seconds. In another instance, the relevant time period may depend upon factors such as the rate of change of geographical location of a source of interference, the length of time the interference exists, the future predictability of the interference, and/or the purpose for determining the interference event. Such a dependency may exist because such factors may determine how long such information or a determination is relevant. In this regard, an aircraft that is producing a GNSS interference to other aircraft (i.e., an aircraft is causing the interference event) may require a determination of such an interference event within several hours in order to allow for the determination of such an interference event to be relevant. Further in this regard, making such a determination within several hours may be required for such a determination to be relevant in mitigation procedures or warnings to other aircraft of the interference event because waiting longer than several hours may mean the interference event may have already ceased to exist (i.e., the aircraft causing the interference event may have landed and be out of service). In another instance, real-time or near real-time may mean a few minutes because that may be the time that is required in order to provide relevant situational awareness of the interference event to other aircraft in the area.

A step 204 may include identifying a plurality of signal drop events based on at least the flight data. For example, the interference detection system 20 may be configured to identify a plurality of signal drop events based on at least the flight data. For instance, the plurality of signal drop events may be a plurality of ADS-B Out signal drop events. In one instance, the identifying of the plurality of signal drop events may occur in real-time or near real-time, based on real-time or near real-time flight data.

For example, the identifying the plurality of signal drop events may be based on a change in an originating source of the geographical location (e.g., latitude and longitude). For instance, the originating source may be an ADS-B source, a multilateration source, a radar source (e.g., ground radar), or other originating source capable of providing or measuring the geographic location (e.g., geographic coordinates) of an aircraft. Further, for example, the identifying the plurality of signal drop events may be based on identifying a change of the originating source (e.g., which may be called the 'Reporting Facility') of geographical coordinates of an entry of a track log of a flight of the flight data. For instance, the originating source may be "ADS-B" in one entry and in the next entry (e.g., later in time) it may be "MLAT" (i.e., multilateration) and in a later entry it may switch back to "ADS-B." The interference detection system 20 may be configured to identify such a change of the origination source (e.g., the change from ADS-B to MLAT, the change back from MLAT to ADS-B, or the combination of both changes) as a signal drop event.

Figure 3:
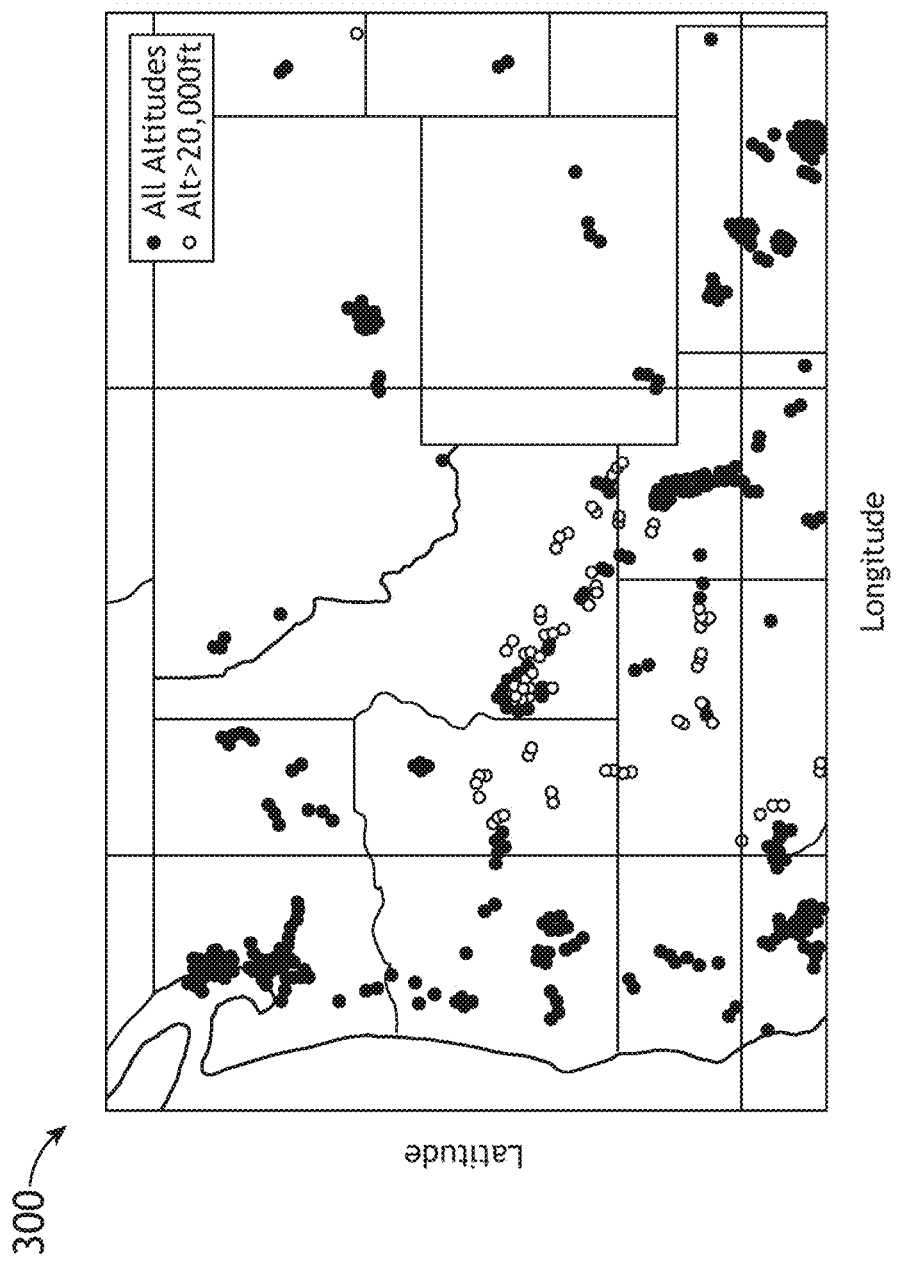
FIG. 3 illustrates a map of co-located signal drop event subsets, in accordance with one or more embodiments of the present disclosure.

A step 206 may include determining one or more co-located signal drop event subsets 302 of FIG. 3 based on at least the plurality of signal drop events and filter criteria. For example, the interference detection system 20 may be configured to determine one or more co-located signal drop event subsets 302 based on at least the plurality of signal drop events and filter criteria. For instance, each of the one or more co-located signal drop event subsets may be based on at least two or more of the plurality of signal drop events. In one instance, the determining the one or more co-located signal drop event subsets 302 may occur in real-time or near real-time.

Referring to FIG. 3, a map of co-located signal drop event subsets 302, including altitude-filtered co-located signal drop event subsets 304 is shown. It is noted that FIG. 3, including the density of co-located signal drop event subsets 302, is provided merely for illustrative purposes and shall not be construed as limiting the scope of the present disclosure. For example, FIG. 3 may be merely for illustrative purposes of how co-located signal drop event subsets 302 would appear if displayed on a map for clarity and increased understanding of the present disclosure.

Referring to FIG. 3, one or more co-located signal drop event subsets 302 are shown. In addition, altitude-filtered co-located signal drop event subsets 304 are shown. Altitude-filtered co-located signal drop event subsets 304 may be co-located signal drop event subsets 302 which are filtered by an altitude-grouping filter, which may be an example of the filter criteria of Step 206. For example, and as shown in FIG. 3, altitude-filtered co-located signal drop event subsets 304 may be co-located signal drop event subsets 302 which occurred above an altitude threshold (e.g., above 20,000 feet). In another example, the filter criteria may be different or include additional filter criteria. For instance, the altitude threshold may be co-located signal drop event subsets 302 which occurred below or within a certain range. In another instance, the filter criteria may be a geographic-grouping filter based on a geographic location of the plurality of signal drop events, as is shown by FIG. 3. I.e., the co-located signal drop event subsets 302 of FIG. 3 are geographically co-located by a geographic-grouping filter. Other filter criteria may be used to determine the co-located signal drop event subsets 302 as well, such as a time-grouping filter based on time or any other filter criteria (velocity, heading). In another example, a time-grouping filter could be used in combination with a geographic-grouping filter and an altitude-grouping filter to determine one or more co-located signal drop event subsets, as shown by altitude-filtered co-located signal drop event subsets 304 in FIG. 3.

Referring back to Step 206, for instance, each flight of the plurality of flights of the flight data may include a track log. Each track log may include a plurality of entries. Each entry of the plurality of entries may include information such as geographic location, time stamp, course direction, velocity, altitude, originating source of the geographical location, and other flight information recorded by an ADS-B or similar instrument. In this regard, the interference detection system 20 may be configured to determine a co-located signal drop event subset 302 when two or more signal drop events (which may each be from a different flight, each flight including a track log, and each track log including a geographic location) are determined to be within a certain geographical range of each other. The determining that the two or more signal drop events are within a certain geographical range may include comparing the geographic locations of each signal drop event. For instance, the geographic-grouping filter may require that the geographic location of each of the signal drop events be within a certain geographical range threshold, such as within ten nautical miles of each other, in order to be included in a co-located signal drop event subset. Co-located may mean at least being within a certain geographical range but may also (i.e., in addition to being in the same geographical area) include being within a certain time period of each other or any other combination of one or more filter criteria (e.g., altitude-grouping, time-grouping, geographic-grouping filters). The interference detection system 20 may be configured to co-locate (i.e., create a subset of) signal drop events that meet such a geographical range threshold filter criteria. A determining of the geographical range threshold may include choosing a smaller geographical range threshold to increase the likelihood/confidence of correctly determining an interference event or a larger geographical range threshold to increase the chance of detecting interference events at the expense of increased false positive detections.

As discussed above, a time-grouping filter may be based on the time (i.e., time entry, time stamp) of a signal drop event. For example, the entry (e.g., of a track log of a flight) in which a signal drop event is identified may include a time. The time-grouping filter may require that the time of each signal drop event be within a certain threshold, e.g., 5 minutes, in order for the signal drop event to be included (i.e., co-located) in a certain co-located signal drop event subset 302.

A step 208 may include determining one or more interference events based on the one or more co-located signal drop event subsets 302. For example, the interference detection system 20 may be configured to determine one or more interference events based on the one or more co-located signal drop event subsets 302. In one instance, the determining one or more interference events may occur in real-time or near real-time.

For example, the determining the interference events may include determining each co-located signal drop event subset 302 to be a separate interference event. In another example, the determining the interference events or the determining the co-located signal drop event subsets 302 may include filtering out (e.g., using filter criteria to exclude; e.g., the filter criteria may be a second filter criteria) signal drop events or co-located signal drop event subsets that occurred within, above, or below a certain altitude range (e.g., above 20,000 feet, below 20,000 feet), within a certain time period, or any other filter criteria or combination of filter criteria.

In another example, the determining the interference events may include determining a heat map (e.g., heat map 400 of FIG. 4) of the co-located signal drop event subsets 304. Further, the determining the interference events may include identifying the interference events based on at least the heat map 400. For example, the determining the interference events may include identifying the interference events based on identifying the portions of the heat map 400 with the highest densities of co-located signal drop event subsets 304.

Figure 4:
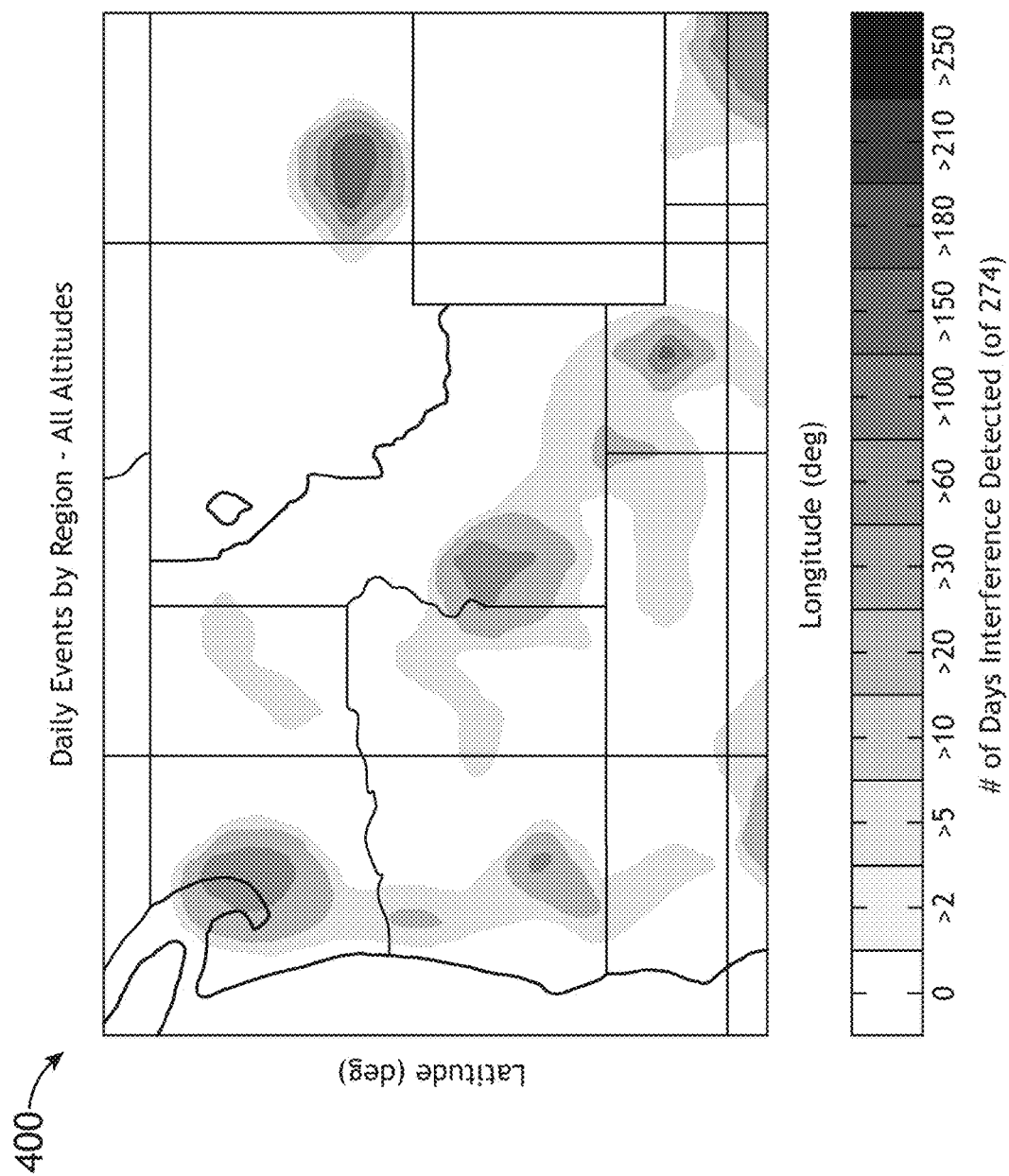
FIG. 4 illustrates a heat map of interference events based on the number of days an interference event was detected, in accordance with one or more embodiments of the present disclosure.

In another example, the heat map 400 may be based on the number of days a co-located signal drop event subset occurred at a similar location such as is shown in FIG. 4. In a further example, the heat map 400 may be based on the number of days a co-located signal drop event subset occurred at a similar location at a certain altitude range (e.g., above 20,000 feet). In a further example, the heat map 400 may be based on the number of times in one day that a co-located signal drop event subset occurred at a similar location.

Referring to FIG. 4, an illustration of interference event heat map 400 is shown. A heat map 400 may be based on the number of days a co-located signal drop event subset (or interference event) occurred at a similar location (as shown by heat map 400 in FIG. 4) or may, in some embodiments (not shown), be based on the number of co-located signal drop event subsets (or interference events) recorded in a single day or other period of time (e.g., a month). In one instance, interference detection system 20 may be configured to display the heat map (e.g., heat map 400) on display 22.

A step 210 may include providing the one or more interference events in real-time to at least one of an air traffic control, ground control, or a pilot of an aircraft. For example, the interference detection system 20 may be configured to provide the one or more interference events in real-time to at least one of an air traffic control, ground control, or a pilot of an aircraft.

The method 200 may include or the interference detection system 20 may be configured to provide air traffic control or a pilot with situational awareness of interference events. The method 200 may include or the interference detection system 20 may be configured to allow air traffic control or pilot to determine an aircraft action or procedure to perform or avoid performing in response to interference events. For example, the air traffic control or pilot may change the course of an aircraft or use a different landing approach based on the interference events.

The inventive concepts disclosed herein are described above with reference to drawings. These drawings illustrate certain details of specific embodiments that implement the systems and methods and programs of the present disclosure. However, describing the inventive concepts with drawings should not be construed as imposing on the inventive concepts disclosed herein any limitations that may be present in the drawings. Embodiments of the inventive concepts disclosed herein contemplate methods, systems and program products on any machine-readable media for accomplishing its operations. Embodiments of the inventive concepts disclosed herein may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Further, no element, component or method step in the present disclosure is intended to be dedicated to the public, regardless of whether the element, component or method step is explicitly recited in the claims.

As noted above, embodiments of the inventive concepts disclosed herein include program products comprising machine-readable storage media for carrying or having machine-executable instructions or data structures stored thereon. Such machine-readable storage media can be any available media that can be accessed by a general purpose or special purpose computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable storage media. Machine-executable instructions include, for example, instructions and data which cause a general-purpose computer, special purpose computer, or special purpose processing machine to perform a certain function or group of functions. Machine or computer-readable storage media, as referenced herein, do not include transitory media (i.e., signals in space).

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A method for interference detection, the method comprising:
   receiving, via an interference detection system coupled to an aircraft, flight data comprising a plurality of flights;
   identifying, via the interference detection system, a plurality of signal drop events based on at least the flight data;
   determining, via the interference detection system, one or more co-located signal drop event subsets based on at least the plurality of signal drop events and filter criteria;
   determining, via the interference detection system, one or more interference events based on the one or more co-located signal drop event subsets;
   wherein each of the one or more co-located signal drop event subsets is based on at least two or more of the plurality of signal drop events.

2. The method of claim 1, each flight of the plurality of flights comprising a track log,
   each track log comprising a plurality of entries,
   each entry of the plurality of entries comprising a geographic location, and
   the filter criteria comprising a geographic-grouping filter based on the geographic location.

3. The method of claim 2, each entry further comprising a time, the filter criteria further comprising a time-grouping filter based on the time.

4. The method of claim 1, the identifying the plurality of signal drop events based on a change in an originating source of a geographical location of the plurality of flights.

5. The method of claim 1, the plurality of signal drop events being a plurality of Automatic Dependent Surveillance-Broadcast (ADS-B) Out signal drop events.

6. The method of claim 1, the determining the one or more interference events occurring in real-time.

7. The method of claim 1, further comprising providing the one or more interference events in real-time to at least one of an air traffic control or a pilot of an aircraft.

8. The method of claim 1, the one or more interference events being two or more interference events, and the method further comprising determining a daily occurrence of interference events based on the two or more interference events.

9. A system comprising:
   an aircraft coupled to an interference detection system; and the interference detection system comprising an electronic processor configured to:

receive flight data comprising a plurality of flights;

identify a plurality of signal drop events based on at least the flight data;

determine one or more co-located signal drop event subsets based on at least the plurality of signal drop events and filter criteria;

determine one or more interference events based on the one or more co-located signal drop event subsets;

wherein each of the one or more co-located signal drop event subsets is based on at least two or more of the plurality of signal drop events.

10. The system of claim 9, each flight of the plurality of flights comprising a track log, each track log comprising a plurality of entries, each entry of the plurality of entries comprising a geographic location, and the filter criteria comprising a geographic-grouping filter based on the geographic location.

11. The system of claim 10, each entry further comprising a time, the filter criteria further comprising a time-grouping filter based on the time.

12. The system of claim 9, the identify the plurality of signal drop events based on a change in an originating source of a geographical location of the plurality of flights.

13. The system of claim 9, the plurality of signal drop events being a plurality of Automatic Dependent Surveillance-Broadcast (ADS-B) Out signal drop events.

14. The system of claim 9, the determining the one or more interference events occurring in real-time.

15. The system of claim 9, further comprising providing the one or more interference events in real-time to at least one of an air traffic control or a pilot of the aircraft.

* * * * *